United States Patent
Knezevic

(10) Patent No.: US 9,270,216 B2
(45) Date of Patent: Feb. 23, 2016

(54) METHOD AND DEVICE FOR PROCESSING A MOTOR SIGNAL

(71) Applicant: BROSE FAHRZEUGTEILE GMBH & CO. KOMMANDITGESELLSCHAFT, HALLSTADT, Hallstadt (DE)

(72) Inventor: Jovan Knezevic, Bamberg (DE)

(73) Assignee: Brose Fahrzeugteile GmbH & Co. Kommanditgesellschaft, Hallstadt, Hallstadt (DE)

( * ) Notice: Subject to any disclaimer, the term of this patent is extended or adjusted under 35 U.S.C. 154(b) by 239 days.

(21) Appl. No.: 14/040,954

(22) Filed: Sep. 30, 2013

(65) Prior Publication Data

US 2014/0028235 A1 Jan. 30, 2014

Related U.S. Application Data

(63) Continuation of application No. PCT/EP2012/001325, filed on Mar. 27, 2012.

(30) Foreign Application Priority Data

Mar. 30, 2011 (DE) .................. 10 2011 015 450

(51) Int. Cl.
*H02P 7/06* (2006.01)
*H02P 7/00* (2006.01)
(Continued)

(52) U.S. Cl.
CPC .............. *H02P 7/0094* (2013.01); *G01D 3/032* (2013.01); *G01P 3/4802* (2013.01)

(58) Field of Classification Search
CPC .............. H02P 6/00; H02P 7/00; H02P 31/00
USPC .......... 318/400.04, 400.05, 400.32, 459, 478, 318/490
See application file for complete search history.

(56) References Cited

U.S. PATENT DOCUMENTS 4,924,166 A * 5/1990 Roussel .................. 318/608
5,796,237 A 8/1998 Yamakawa
(Continued)

FOREIGN PATENT DOCUMENTS

CN 1138244 A 12/1996
DE 254254 A1 2/1988
(Continued)

OTHER PUBLICATIONS

International Search Report of PCT/EP2012/001325, Dated Feb. 18, 2013.

*Primary Examiner* — Bentsu Ro
(74) *Attorney, Agent, or Firm* — Laurence A. Greenberg; Werner H. Stemer; Ralph E. Locher

(57) ABSTRACT

A method and a device process a motor signal of a direct current motor, in particular of an adjustment drive of a motor vehicle. The armature current and the motor voltage of the direct current motor are detected and used for determining the counter induction voltage of the direct current motor, by which a number of control signals having different ripple frequencies for controllable frequency filters are generated. The current ripples that are generated in a frequency dependent manner by the frequency filters, to which a filter input signal derived from the armature current and the motor voltage is applied, are synchronized with each other in the course of the ripple count.

9 Claims, 2 Drawing Sheets

(51) Int. Cl.
*G01P 3/48* (2006.01)
*G01D 3/032* (2006.01)

(56) References Cited

U.S. PATENT DOCUMENTS 6,559,616 B2 * 5/2003 Aoki et al. .................. 318/567
8,310,185 B2 11/2012 Knezevic et al.

2006/0138982 A1 6/2006 Marty
2011/0270558 A1 11/2011 Knezevic et al.

FOREIGN PATENT DOCUMENTS

| JP | 2008283762 A | 11/2008 |
| WO | 2010028736 A2 | 3/2010 |
| WO | 2010105795 A2 | 9/2010 |

* cited by examiner

METHOD AND DEVICE FOR PROCESSING A MOTOR SIGNAL

CROSS-REFERENCE TO RELATED APPLICATION

This is a continuation application, under 35 U.S.C. §120, of copending international application No. PCT/EP2012/001325, filed Mar. 27, 2012, which designated the United States; this application also claims the priority, under 35 U.S.C. §119, of German patent application No. 10 2011 015 450.7, filed Mar. 30, 2011; the prior applications are herewith incorporated by reference in their entirety.

BACKGROUND OF THE INVENTION

Field of the Invention

The invention relates to a method and to a device for processing a motor signal of a direct current motor, containing a controllable frequency filter which, on the basis of the waves (current ripples) contained in the armature current of the direct current motor, generates a speed-proportional output signal. The speed-proportional output signal can be used in order to establish speed and/or rotational direction and also in particular in order to determine the position of an adjustment part of a motor vehicle. The adjustment part being displaceable by an electromotive actuating drive.

It is known from international patent disclosure WO 2010/028736 A2, corresponding to U.S. patent publication No. 2011/0270558, in order to process a motor signal of a direct current motor with use of a controllable frequency filter, to generate a speed-proportional signal in order to determine the position of an adjustment device of a motor vehicle. To this end, the armature current and the motor voltage of the direct current motor are determined and are used in order to establish the mutual induction voltage (back-emf) of the direct current motor. A control signal established from the mutual induction voltage is fed to the frequency filter on the control side, and a filter input signal that is derived from the armature current signal containing the current ripple and from the motor voltage signal, which is preferably weighted with a low-pass characteristic, is fed to the frequency filter on the signal input side. The frequency filter, which for example is effective as a band-pass, generates a filter output signal that is used in order to count the current ripples contained in the armature current.

It is not often possible however to count the current ripples in an error-free manner during an adjustment process, in particular not in all phases of a typical adjustment process. The motor speed during a start-up phase oscillates transiently to a stable end speed, which is approximately constant in the subsequent equilibrium phase, as is the frequency of the current ripple (ripple frequency).

Due to comparatively irregular current conditions during an adjustment process, counting errors when counting the ripples normally occur, at least in specific adjustment phases, in conventional methods for ripple counting. Such counting errors are produced predominantly since current ripples in the current signal are not identified and are therefore absent from a ripple signal used in order to determine controlled variables or a position. Furthermore, counting errors may also occur however as a result of the fact that externally produced interferences of the motor current path are incorrectly identified as current ripples. Both types of counting errors lead to errors when determining the controlled variables. In particular when calculating the adjustment position, these errors may unfavorably accumulate over the course of a plurality of successive adjustment processes and may therefore significantly impair the function of the adjustment device in some circumstances.

It is known from international patent disclosure WO 2010/105795 A2, corresponding to U.S. Pat. No. 8,310,185, in order to correct counting errors when evaluating current ripples, to use a direct current motor that, by mechanical or electromechanical modification, has a normal ripple pattern which, per motor cycle, contains at least one index ripple deviating in terms of amplitude, period, and/or position over time from the majority of the other ripples of the motor cycle. During operation of this motor, the mutual induction voltage (back electromagnetic force) is calculated from the measured motor current and the measured motor voltage by a motor model, and an alternating component corresponding to the current ripples is extracted from this. The current ripples, in particular the moments in time and amplitudes thereof, are identified from this alternating component of the mutual induction voltage.

Here, in accordance with the method, the index ripple is identified, preferably in each motor cycle, on the basis of its characterizing features (that is to say deviating properties) known beforehand. In addition, the current ripples identified on the whole are counted. The counting result, which is a measure for the controlled variable to be established or for the change thereto, is corrected in this case by a corresponding number of counting units when the index ripple is not identified (counted) at the expected position, but at a position shifted relative thereto.

SUMMARY OF THE INVENTION

The object of the invention is to specify a method that is particularly suitable for processing a motor signal of a direct current motor and that enables reliable ripple counting in a simple manner alongside counting error identification and correction that are as reliable as possible. Furthermore, a device suitable for this purpose will be specified.

To this end, the armature current and the motor voltage of the direct current motor are determined and are used in order to establish the mutual induction voltage of the motor in order to derive therefrom a number of control signals having different ripple frequencies for a corresponding number of controllable frequency filters, to which a filter input signal derived from the armature current and the motor voltage is fed. The ripples, generated in a frequency-dependent manner, are counted separately, and the counted ripples are synchronized with one another, in particular upon each motor revolution or upon each motor cycle.

In an advantageous development, a first speed-proportional control signal having a first ripple frequency (basic frequency) is fed to a first controllable frequency filter, whereas a control signal having a second ripple or basic frequency corresponding to a multiple of the motor speed is fed to a second controllable frequency filter. The speed-proportional control signal having, for example, the lowest ripple or basic frequency contains an individual ripple per motor cycle or revolution, for example. Since, due to specific electrical or mechanical conditions of the motor or measures performed thereon accordingly, a specific ripple frequency is expected at a specific multiple of the motor speed, a control signal that corresponds to the first control signal multiplied by a corresponding multiple of the motor speed is fed to the second controllable frequency filter.

The device for processing a motor signal of a direct current motor, in particular of an actuating drive of a motor vehicle, contains a measuring device for determining the armature current and the motor voltage of the direct current motor and also at least one function module for establishing a control signal from the mutual induction voltage of the direct current motor. The measuring device is arranged upstream of at least two controllable frequency filters, to respective signal inputs of which a filter input signal derived from the armature current and the motor voltage is guided. Control signals having a different ripple frequency and derived from the armature current and the motor voltage are guided to the control inputs of the frequency filters. The frequency filters are advantageously guided on the output side to ripple counters synchronized with one another.

The advantages achieved by the invention are in particular the fact that, due to the use of a plurality of controllable frequency filters which are controlled with control signals of different ripple frequency, counting errors during the ripple counting process can be identified and corrected, even without the presence of special index ripples. Since, as is known, low ripple frequencies can be easily identified at high motor speeds and high ripple frequencies can be easily identified at low motor speeds, it is expedient, in the start-up phase of the direct current motor, to start the ripple counting by means of activation initially of the frequency filter controlled with a multiple of the motor speed and of accordingly high ripple frequency. This approach is also advantageous in view of the fact that, at low speeds, it is difficult to separate the direct current component from the motor signal or armature current signal having low frequency components.

As soon as the direct current motor is started and the speed thereof rises, the further frequency filters, controlled at a relatively low frequency, can also be connected. Once all provided frequency filters have been activated and the corresponding ripple counts have been started, each ripple counter, under the assumption that there are no counting errors, delivers practically the same contribution to the identification of the position of the controlled part or adjustment part driven by the direct current motor. The ripple counter arranged downstream of a frequency filter controlled at low frequency thus delivers, for example, a single ripple with each motor revolution, whereas a frequency filter controlled with the multiple of the speed and therefore with an accordingly higher ripple frequency generates a corresponding multiple of ripples per motor cycle (motor revolution).

By synchronizing the ripple counters involved, counting errors can thus be corrected suitably by removing or adding a ripple counted too many times or too few times in a ripple counter when another ripple counter reaches its cyclically expected ripple number and/or has started a new ripple cycle.

The method according to the invention is preferably carried out with use of a mechanically commutated direct current motor, which, by mechanical, electrical or electromechanical modification, generates an armature current that contains current ripples having at least two different ripple frequencies. A particularly simple and reliable correction of counting errors when establishing the relative position of a motor vehicle adjustment element, driven by the motor, by counting the current ripples is thus achieved.

Other features which are considered as characteristic for the invention are set forth in the appended claims.

Although the invention is illustrated and described herein as embodied in a method and a device for processing a motor signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Corresponding parts are provided in all figures with like reference signs.

Figure 1:
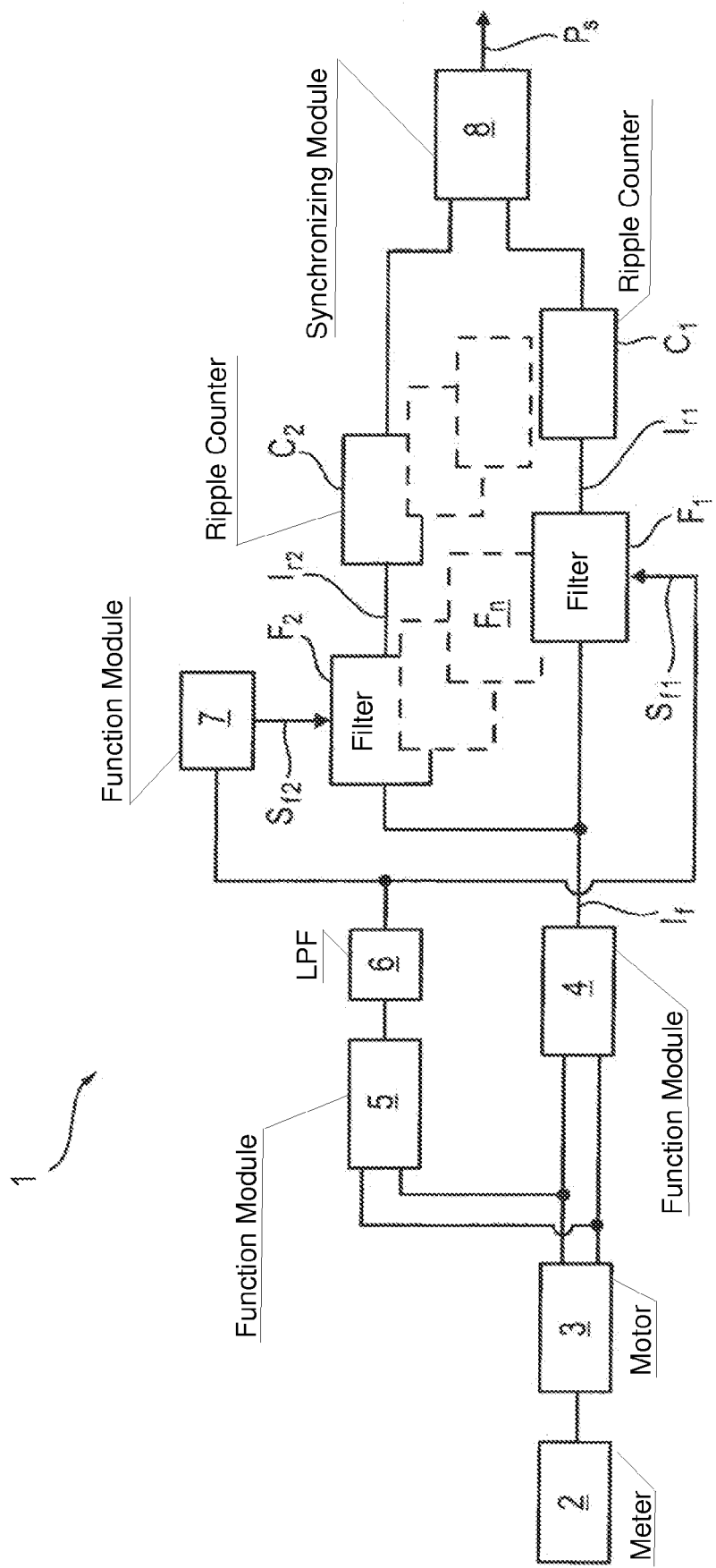
FIG. 1 is a block diagram illustrating function blocks of a device for processing a motor signal by a number of controllable frequency filters according to the invention.

Referring now to the figures of the drawings in detail and first, particularly to FIG. 1 thereof, there is shown a block diagram representing a function of a method and of a device for establishing current ripples generated in an armature current signal $I_a$ of a direct current motor as a result of the commutation thereof. These current ripples or current waves are superimposed as an alternating signal component on the direct current signal of the direct current motor. Since the number of commutator segments of the direct current motor is known, the motor speed and the position of the motor armature (armature position) can be determined from the number of current ripples per unit of time. The armature position or location in turn corresponds to the position of an adjustment element of a motor vehicle, the adjustment element being driven by the direct current motor. For example, the position of a window pane in a vehicle, the window pane being automatically adjustable by a window lifter drive, along its adjustment path between an upper closed position and a lower open position can thus be determined accurately.

The device 1 contains a number of adjustable frequency filters $F_n$, preferably in the form of tunable band-passes, and also a measuring device 2 with means for determining both an armature current signal $I_a$ referred to hereinafter as an armature current and also a motor voltage signal of a direct current motor 3, referred to hereinafter as a motor voltage $U_m$. Although a plurality of frequency filters $F_n$ can be provided, as illustrated by the dashed function blocks, two frequency filters $F_1$ and $F_2$ are assumed in the exemplary embodiment described hereinafter for the sake of simplicity.

The frequency $f_n$ of the adjustable band-pass is determined by the following relationship:

$$f_n = n = k \cdot E \qquad (1),$$

with $$E = U_m - R_a \cdot I_a \qquad (2).$$

Here, E is the mutual induction voltage (back-emf), $U_m$ is the motor voltage, $R_a$ is the winding resistance of the armature winding of the direct current motor, $I_a$ is the armature current, k is a motor constant, and n is the motor speed.

The equation (3) below describes the mathematical model of the direct current motor $$U_m = R_a \cdot I_a + L_a \cdot \frac{dI_a}{dt} + E, \quad (3)$$

wherein $L_a \cdot dI_a/dt$ is the self-induction voltage with $L_a$ as winding inductance of the armature winding. From this, the armature current $I_a$ can be established as follows:

$$I_a = \frac{1/R_a}{1 + sL_a/R_a}(U_m - E). \quad (5)$$

In accordance with the relationship $I_f = I_a - I_e$, where $I_e = U_m/R_a$, a filter input signal $I_f$ can be established by subtraction and is fed to the frequency filters $F_{1,2}$ on the input side. To this end, a function module 4 with multiplier and subtraction function is arranged before the frequency filters $F_{1,2}$ on the signal input side.

In the function module 4, in a manner not presented in greater detail, but described in detail in international patent document WO 2010/028736 A2 mentioned in the introduction and to which reference is hereby expressly made and incorporated herein, the determined armature current signal $I_a$ is fed directly to a subtraction stage and the motor voltage $U_m$ is fed via a multiplier, in which there is a weighting of the measured motor voltage $U_m$ with the factor resulting from equation (5)

$$A = \frac{1/R_a}{(1 + sL_a/R_a)}.$$

This term corresponds to a low-pass or a low-pass function of first order and therefore forms a low-pass-characteristic factor A. The weighted signal $A \cdot U_m$ is subtracted from the determined armature current signal $I_a$. The difference signal $I_f$, of which the typical progression is illustrated in the upper graph of FIG. 2, is fed to the frequency filters $F_{1,2}$ as a filter input signal $I_f$.

The control signals $S_{f1}$ and $S_{f2}$ fed on the control side to the respective frequency filter $F_1$ and $F_2$ in order to determine the frequency thereof or in order to adjust a limit frequency or center frequency are established in accordance with the relationship $E = U_m - R_a \times I_a + L_a \times dI_a/dt$ by subtraction in a further function module 5, to which both the armature current signal $I_a$ and the motor voltage $U_m$ are likewise fed. The function module 5 in turn contains a subtraction stage in accordance with international patent disclosure WO 2010/028736 A2. For multiplication both of the motor voltage $U_m$ by the factor p/K and also of the armature current signal $I_a$ by the factors p/K and p/k·$R_a$ in accordance with the relationships $S_{f1} = f_n = n \cdot p = k \cdot E$ and $S_{f1} = p/k \cdot U_m - p/k \cdot R_a \cdot I_a$, a multiplier is provided in each case (WO 2010/028736 A2). Here, p is the pole slot number or commutator segment slot number of the motor 3.

Figure 2:
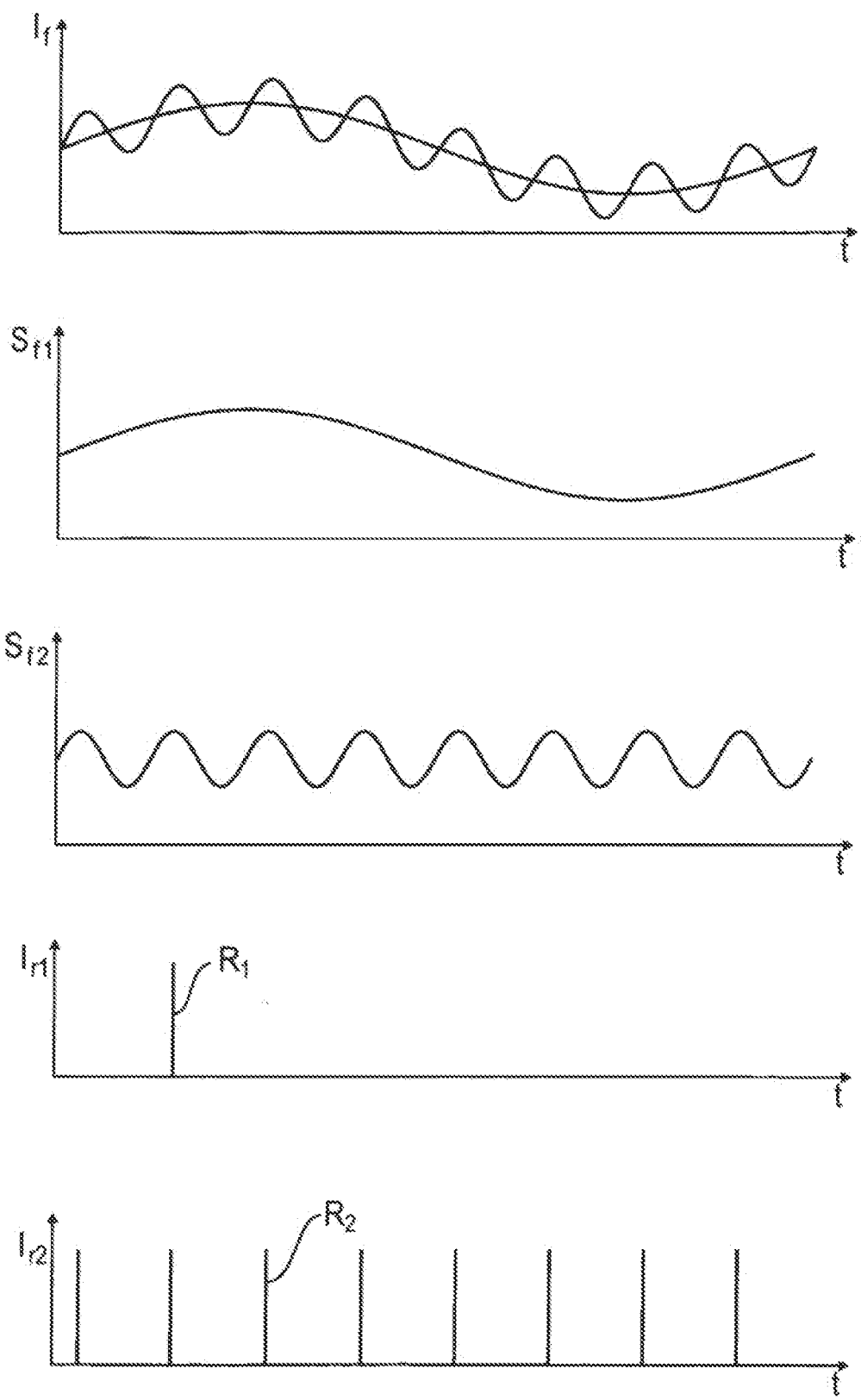
FIG. 2 shows five synchronous graphs against time arranged above one another, a signal curve of an armature current during a motor revolution with two different ripple frequencies, the control signals derived therefrom for two frequency filters, and current ripples identified in this case and countable by two ripple counters.

An output signal $S_f$ that can be tapped off at the function module 5 on the output side is fed to a low-pass filter 6, which, on the output side, delivers the control signal $S_{f1}$ illustrated in the second graph of FIG. 2. The control signal $S_{f1}$ filtered using a low-pass filter is fed to the control input of the filter module $F_1$.

The control signal $S_{f1}$ is multiplied in a function module 7 by the rotational speed n of the motor 3. The resultant control signal $S_{f2} = n \cdot S_{f1}$ for the second frequency filter $F_2$ is illustrated in the third graph in FIG. 2. The ripple frequency $f_2$ of this control signal $S_{f2}$ for the second frequency filter $F_2$ is visibly eight times greater in the exemplary embodiment than the ripple frequency $f_1$ of the control signal $S_{f1}$ for the first frequency filter $F_1$.

The ripple signals $I_{r1}$ and $I_{r2}$ that are generated as a result of the frequency filtering and that can be tapped off on an output side at the frequency filters $F_1$ and $F_2$ are illustrated in FIG. 2 in the two lower graphs. These ripple signals $I_{r1}$ and $I_{r2}$ are fed to ripple counters $C_1$ and $C_2$ arranged downstream of the frequency filters $F_1$ and $F_2$ on the output side in order to count the respective current ripples $R_1$ and $R_2$. A synchronization module 8 is associated with the ripple counters $C_1$ and $C_2$ and synchronizes the ripple counters $C_1$ and $C_2$ upon each motor revolution or upon each motor cycle. A position signal $P_s$ containing information concerning the position (controlled variable) of the direct current motor 3 and therefore the (relative) position of the motor vehicle adjustment element can be tapped off on the output side at the synchronization module 8.

The ripple frequency $F_1$ of the control signal $S_{f1}$ associated with the first frequency module $f_1$ is $f_1 = 100$ Hz in the exemplary embodiment. The ripple frequency $f_2$ of the control signal $S_{f2}$ fed to the second frequency module $F_2$ is therefore $f_2 = 800$ Hz in the exemplary embodiment. Consequently, the ripple signal $I_{r1}$ contains an individual current ripple $R_1$ per motor revolution (motor cycle), whereas the ripple signal $I_{r2}$ contains eight current ripples $R_2$ in the same period of time, that is to say again with each motor revolution.

Whereas these cyclically successive current ripples $R_2$ of the ripple signal $I_{r2}$ can be expected relatively reliably at the low motor speed n, the evaluation of the ripple signal $I_{r1}$ and the counting of the current ripple $R_1$ thereof is relatively reliable at high motor speed n.

After or during each motor revolution of the direct current motor 3, an individual current ripple $R_1$ is therefore expected in the ripple counter $C_1$, and eight current ripples $R_2$ are therefore expected in the ripple counter $C_2$ during the same period of time. Missing or excessively counted current ripples can thus be corrected cyclically. This in turn ensures a reliable determination of the position of the adjustment part, for example a window pane, of the motor vehicle, the adjustment part being driven by the direct current motor 3.

To summarize, in accordance with the invention, the armature current $I_a$ and the motor voltage $U_m$ of the direct current motor 3 are determined in order to process a motor signal $I_a$, $U_m$ of a direct current motor 3, in particular of an adjustment drive of a motor vehicle. On the basis of the mutual induction voltage E established therefrom, a filter input signal $I_f$ and in particular speed-proportional control signals $S_{fn}$ having different ripple frequency $F_n$ are generated from the armature current signal $I_a$ for one of the number of controllable frequency filters $F_n$. Synchronized ripple counters $C_n$ make it possible in a simple and reliable manner to identify and correct counting errors due to current ripples $R_n$ that have not been generated or that have been generated excessively.

The invention claimed is:

1. A method for processing a motor signal of a direct current motor, which comprises the steps of:
   determining an armature current $I_a$ and a motor voltage $U_m$ of the direct current motor;
   determining a mutual induction voltage E of the direct current motor from the armature current $I_a$ and the motor voltage $U_m$;
   feeding a filter input signal $I_f$ derived from the armature current $I_a$, a winding resistance $R_a$ of an armature winding of the direct current motor, and the motor voltage $U_m$ to a controllable frequency filter;

generating a number of control signals $S_{fn}$ having different ripple frequencies, where the controls signals $S_{fn}=k \cdot E$, where k is a motor constant of the direct current motor;

feeding the control signals to a corresponding number of the controllable frequency filters resulting in a generation of current ripples; and counting separately the current ripples generated in a frequency-dependent manner and counted current ripples are synchronized with one another.

2. The method according to claim 1, which further comprises feeding the ripple currents generated by the controllable frequency filters in a frequency-dependent manner each on an output side to a ripple counter.

3. The method according to claim 1, wherein the control signals include a speed-proportional control signal and a control signal having a second frequency, which method further includes the steps:

feeding the speed-proportional control signal having a first ripple frequency to a first controllable frequency filter; and feeding the control signal having the second ripple frequency corresponding to a multiple of a motor speed to a second controllable frequency filter.

4. The method according to claim 1, wherein the direct current motor is an actuating drive of a motor vehicle.

5. A device for processing a motor signal of a direct current motor, the device comprising:

a measuring device for determining an armature current and a motor voltage of the direct current motor;

at least one function module for generating control signals from a mutual induction voltage of the direct current motor; and at least two controllable frequency filters, said measuring device disposed upstream of said at least two controllable frequency filters, said at least two controllable frequency filters having an input side receiving a filter input signal derived from the armature current and from the motor voltage, said at least two controllable frequency filters having a control input side, the control signals being derived from the armature current and the motor voltage and having different ripple frequencies are received by said control input side of said at least two controllable frequency filters, said at least two controllable frequency filters each having an output side outputting ripple signals.

6. The device according to claim 5, further comprising ripple counters, said output side of said at least two controllable frequency filters coupled to said ripple counters.

7. The device according to claim 6, wherein said ripple counters are synchronized with one another.

8. The device according to claim 6, wherein the device processes a motor signal of an actuating drive of a motor vehicle.

9. An operating method, which comprises the steps of:

providing a mechanically commutated direct current motor;

generating, via the mechanically commutated direct current motor, by means of mechanical, electrical or electromechanical modification, an armature current $I_a$ containing current ripples having at least two different ripple frequencies for correction of counting errors when establishing a relative position of an adjustment element of a motor vehicle by counting the current ripples;

determining the armature current $I_a$ and a motor voltage $U_m$ of the mechanically commutated direct current motor;

determining a mutual induction voltage E of the mechanically commutated direct current motor from the armature current $I_a$ and the motor voltage $U_m$;

feeding a filter input signal $I_f$ derived from the armature current $I_a$, the winding resistance $R_a$ of an armature winding of the mechanically commutated direct current motor, and the motor voltage $U_m$ to the controllable frequency filter;

generating a number of control signals $S_{fn}$ having different ripple frequencies where the controls signals $S_{fn}=k \cdot E$, where k is a motor constant the mechanically commutated direct current motor;

feeding the control signals to a corresponding number of the controllable frequency filters; and counting separately the current ripples generated in a frequency-dependent manner and counted current ripples are synchronized with one another.

* * * * *